(12) United States Patent
Yoon et al.

(10) Patent No.: US 8,224,158 B2
(45) Date of Patent: Jul. 17, 2012

(54) METHOD FOR SETTING PLAYBACK ENVIRONMENT OF AN INTERACTIVE DISK

(75) Inventors: Woo Seong Yoon, Namyangjoo-si (KR); Jea Yong Yoo, Seoul (KR); Limoniv Alexandre, Seoul (KR); Seung Hoon Lee, Sungnam-si (KR)

(73) Assignee: LG Electronics Inc., Seoul (KR)

(*) Notice: Subject to any disclaimer, the term of this patent is extended or adjusted under 35 U.S.C. 154(b) by 1902 days.

(21) Appl. No.: 10/671,374

(22) Filed: Sep. 25, 2003

(65) Prior Publication Data

US 2004/0175154 A1    Sep. 9, 2004

(30) Foreign Application Priority Data

Mar. 6, 2003  (KR) ................... 10-2003-0014161

(51) Int. Cl.
*H04N 9/80* (2006.01)
(52) U.S. Cl. ...................................... 386/257
(58) Field of Classification Search ............... 386/1, 46, 386/52–55, 95, 96, 121, 125–126; 725/135–142; 715/201–202, 234
See application file for complete search history.

(56) References Cited

U.S. PATENT DOCUMENTS

| | | | |
|---|---|---|---|
| 5,793,726 A | 8/1998 | Nagano | |
| 6,138,175 A | 10/2000 | deCarmo | |
| 6,167,189 A | 12/2000 | Taira et al. | |
| 6,580,870 B1 * | 6/2003 | Kanazawa et al. | 386/95 |
| 2001/0030667 A1 * | 10/2001 | Kelts | 345/854 |
| 2001/0056580 A1 | 12/2001 | Seo et al. | |
| 2002/0176693 A1 | 11/2002 | Cho et al. | |
| 2003/0049017 A1 | 3/2003 | Chung et al. | |
| 2003/0086690 A1 * | 5/2003 | Chung et al. | 386/69 |

FOREIGN PATENT DOCUMENTS

| | | |
|---|---|---|
| CN | 1441598 | 9/2003 |
| EP | 1 256 954 A2 | 11/2002 |
| EP | 1 267 273 A2 | 12/2002 |
| EP | 1 267 352 A2 | 12/2002 |
| EP | 1 357 749 A1 | 10/2003 |
| JP | 2002-124069 | 4/2002 |
| KR | 10-2000-0008905 A | 2/2000 |
| KR | 10-2002-0071814 A | 9/2002 |
| TW | 430785 B | 4/2001 |
| WO | WO-2004/036576 A1 | 4/2004 |

* cited by examiner

*Primary Examiner* — William C Vaughn, Jr.
*Assistant Examiner* — Eileen Adams
(74) *Attorney, Agent, or Firm* — Birch, Stewart, Kolasch & Birch, LLP.

(57) ABSTRACT

In accordance with one or more embodiments, a method for setting a playback environment for an ENAV recording medium comprises determining availability of additional contents associated with audio/video (A/V) data recorded on the ENAV recording medium, based on data recorded on the ENAV recording medium; loading the additional contents in a temporary storage area; and reproducing the A/V data and the additional contents loaded in the temporary storage area according to the data.

20 Claims, 3 Drawing Sheets

METHOD FOR SETTING PLAYBACK ENVIRONMENT OF AN INTERACTIVE DISK

CROSS-REFERENCE TO RELATED APPLICATIONS

Pursuant to 35 U.S.C. §119(a), this application claims the benefit of earlier filing date and right of Korean Patent Application No. 10-2003-14161, filed on Mar. 6, 2003, the content of which is hereby incorporated by reference herein in its entirety.

BACKGROUND OF THE INVENTION

1. Field of the Invention

The present invention relates to a method for setting a playback environment for reproducing audio/video (A/V) data in an interactive or enhanced recording medium, such as an interactive digital versatile disk (i.e., I-DVD or Enhanced Digital Versatile Disk(EDVD)), along with additional contents associated with the A/V data.

2. Description of the Related Art

High-density optical disks (e.g., digital versatile disks (DVDs)) are capable of recording and storing large-capacity digital data. The DVDs are large-capacity recording mediums capable of permanently recording and storing not only high-quality digital audio data, but also high-quality moving picture data.

A DVD includes a data stream recording area for recording a digital data stream, such as moving picture data and a navigation data recording area for recording navigation data needed for controlling playback of the moving picture data. A typical DVD player first reads the navigation data recorded on the navigation data recording area, if the DVD is seated in the player, stores the read navigation data in a memory provided in the player, and reproduces the moving picture data recorded on the data stream recording area using the navigation data.

The DVD player reproduces the moving picture data recorded on the DVD, such that a user can view and hear a movie recorded on the DVD. Information (control or additional information) associated with the playback of audio/video (A/V) data recorded on the DVD can be recorded as a file written in a hypertext markup language (HTML) on the DVD. Standardization work of an interactive digital versatile disk (I-DVD) is ongoing. The A/V data recorded on the I-DVD is reproduced according to the user's interactive request. Where I-DVDs are commercialized, the supply of contents through digital recording mediums will be more prevalent.

A method is being developed for seamlessly and continuously reproducing A/V data in an I-DVD, at the time of a synchronous playback operation for the A/V data and additional contents, i.e., ENAV data, associated with the A/V data recorded on the I-DVD. Various playback environments must be set before the data of the disk is reproduced so that the A/V data and the ENAV data on the disk can be seamlessly reproduced and outputted under limited resources of the player.

SUMMARY OF THE INVENTION

In accordance with one or more embodiments, a method for setting a playback environment for an ENAV recording medium comprises determining availability of additional contents associated with audio/video (A/V) data recorded on the ENAV recording medium, based on first data recorded on the ENAV recording medium; loading the additional contents in a temporary storage area; and reproducing the A/V data recorded on the ENAV recording medium and the additional contents loaded in the temporary storage area according to the first data.

In one embodiment, the first data comprises ENAV environment elements included in a start-up file, or information about location where the additional contents can be accessed. The first data is stored in the temporary storage area, prior to the A/V data being reproduced. The first data may also comprise access information about the additional contents.

In some embodiments, the method for setting the playback environment further comprises loading the first data into the temporary storage area prior to loading the additional contents in the temporary storage area. The ENAV environment elements may comprise a playback right, a region code, a language of the additional contents, memory management information, or other environment related information.

In one embodiment, the start-up file is loaded into a temporary storage area. The ENAV environment elements comprises a list of additional contents associated with playback right information, wherein the additional contents are differently designated according to the playback right information. The ENAV environment elements can include a list of additional contents associated with region code information, wherein the additional contents are differently designated according to the region code information.

In one embodiment, the start-up file is a text markup language file. The ENAV environment elements is received through a communication network from an external server. And, the first data comprises a list of additional contents. In certain embodiments, the list of additional contents updates any additional contents information recorded on the ENAV recording medium.

At least a portion of the additional contents associated with the A/V data is preloaded in the temporary area in advance of reproducing the A/V data, so that the A/V data can be seamlessly reproduced in synchronization with respective additional contents, wherein the temporary storage area is in a semiconductor storage device. In some embodiments, the temporary area has a predetermined capacity, for example, 36 Mbytes.

Accordingly, the step of storing the additional contents, in another embodiment may comprise setting a language of the additional contents; and allocating a space in the temporary storage area based on the ENAV environment elements to store the additional contents. Setup information is designated within the ENAV environment elements. In certain embodiments, the setup information comprises information related to a menu screen.

In accordance with one or more embodiments of the invention, the step of reproducing the A/V data comprises synchronizing reproduction of the additional contents and the A/V data; preloading the additional contents in the temporary storage area in advance of reproducing the A/V data recorded on the ENAV recording medium; and outputting the additional contents in the temporary storage area at least at the same time as reproducing the A/V data recorded in the ENAV recording medium.

New additional content is preloaded in the temporary storage area as storage space in the temporary storage area becomes available when the additional content stored in the temporary storage area is reproduced. The additional contents consist of a markup language file, a text file, image file, an Audio file, or equivalents thereof.

In accordance with another embodiment of the invention, an ENAV recording medium comprises audio/video (A/V) data; access information to additional contents associated with the A/V data; and start-up information for setting playback environment. The additional contents are stored on the recording medium or on a content provider remotely accessible through a communications network. The start-up information comprises the access information to the additional contents.

In some embodiments, the start-up information is preloaded into a memory, and A/V data is read out from an ENAV recording medium. The memory is included in an ENAV player device, and wherein the start-up information is preloaded into the memory, before the A/V data are reproduced by the player. The start-up information may further comprise information about a playback right of the recording medium, a region code, a language of the additional contents, or other environment related information.

In some embodiments, the start-up information further comprises information about website connection limitations, memory management, or playback environment. The A/V data is recorded on a first segment of the recording medium; the access information is recorded on a second segment of the recording medium; the additional contents information is recorded on a third segment of the recording medium; and the start-up information is recorded on a fourth segment of the recording medium, in certain embodiments, for example.

In some embodiments, the start-up information can be included in a start-up file. The start-up file comprises a plurality of playback right information for designating a plurality of additional content categories; or a plurality of region code information for designating a plurality of additional content categories, for example.

In yet another embodiment, an ENAV medium player system comprises a audio/video (A/V) player engine for reproducing A/V data recorded on an ENAV medium; and an ENAV player engine for reproducing in synchronization with the A/V data associated additional contents based on ENAV environment elements recorded on the ENAV medium. The ENAV environment elements are included in a start-up file that is loaded into a temporary storage medium.

The ENAV environment elements comprise information about a location where the additional contents can be accessed. The ENAV environment elements are stored in a temporary storage area, prior to the A/V data being reproduced. The ENAV environment elements comprise information about the additional contents to be loaded into the temporary storage area, before the A/V data is reproduced. The ENAV environment elements may comprise playback right information, region code information, information about language of the additional contents, and memory management information.

In some embodiments, a method of playing back ENAV data recorded on a recording medium comprises determining if a recording medium is an ENAV=recording medium; playing audio/video A/V data recorded on the recording medium, if the recording medium is not an ENAV recording medium; and playing additional contents in synchronization with the A/V data recorded on the recording medium, if the recording medium is an ENAV recording medium; wherein a start-up file comprising ENAV environment elements are preloaded into a memory prior to playing the additional contents associated with A/V data.

The start-up file comprises website access information, in some embodiments, limiting access to at least one website according to the website access information. In other embodiments, the start-up file comprises website access information providing access to at least one website according to the website access information. The start-up file can comprise website access information, wherein the website comprises the additional contents.

In accordance with one or more embodiments, an ENAV player device for playing back ENAV data recorded on a recording medium comprises a detecting unit for determining if a recording medium is an ENAV recording medium; an first engine for playing audio/video (A/V) data recorded on the recording medium, if the recording medium is not an ENAV recording medium; a second engine for playing additional contents in synchronization with the A/V data recorded on the recording medium, if the recording medium is an ENAV recording medium; and a memory, wherein a start-up file comprising ENAV environment elements is preloaded into the memory prior to playing the additional contents.

In one embodiment, the start-up file comprises menu setting information.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments of the system.

DESCRIPTION OF THE PREFERRED EMBODIMENTS

Figure 1:
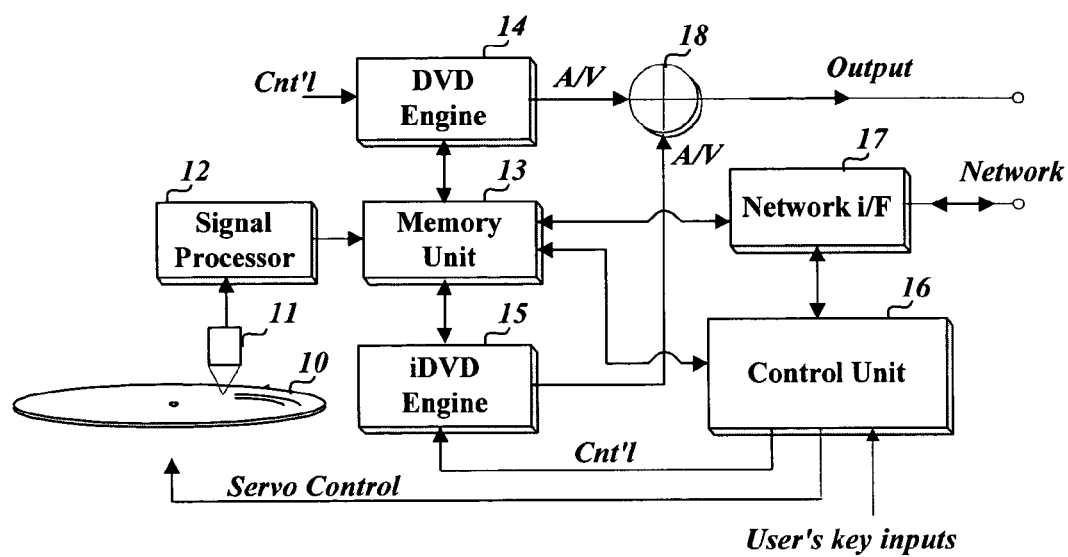
FIG. 1 is a block diagram of an optical disk device to which a method for setting a playback environment of an interactive disk, in accordance with one embodiment of the invention, is applied.

Referring to FIG. 1, in accordance with one embodiment of the present invention, an optical disk device comprises an optical pickup 11 that reads a signal recorded on an ENAV recording medium such as an interactive digital versatile disk (I-DVD) 10. A signal processor 12 processes a read radio frequency (RF) signal and recovers digital data. A memory unit 13 stores the recovered data and externally received data. A DVD engine 14 decodes the data stored in the memory unit 13. An iDVD engine 15 interprets an information file stored in the memory unit 13, and processes certain additional contents (i.e., ENAV data).

A synthesizer 18 synthesizes and outputs an A/V signal from the DVD engine 14 and another A/V signal from the iDVD engine 15. A network interface 17 performs a network connection function and a web browser function. A control unit 16 sets a playback environment of the I-DVD 10 and controls the above-described components so that data of the I-DVD 10 can be reproduced along with the additional contents, under the set playback environment.

Figure 2:
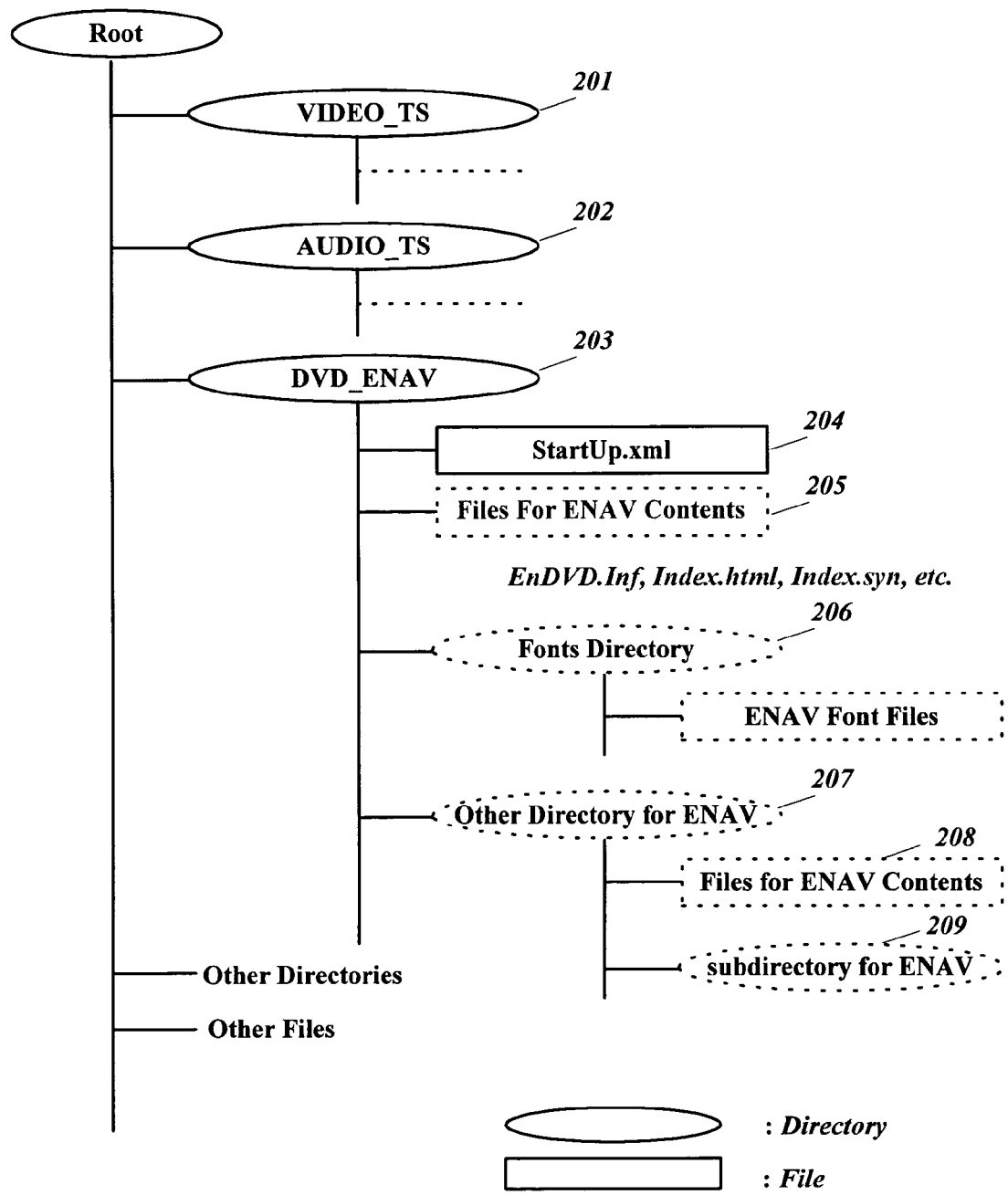
FIG. 2 is a schematic diagram illustrating a directory structure of an interactive digital versatile disk (I-DVD) in accordance with one embodiment of the invention.

An exemplary directory structure of the I-DVD 10 is shown in FIG. 2. An additional contents directory "DVD_ENAV" 203 is arranged under a root directory and comprises a start-up file "StartUp.mls" 204, for example. The start-up files comprises information about the system environment settings. In some embodiments, the environment is set before data of the I-DVD is reproduced.

An information file "EnDVD.Inf", for example, for reproducing A/V data recorded on the I-DVD, an initial screen setup file "index.html", for example, for playback, and synchronization file "index.syn", for example, for the synchronization between data items of different attributes may be part of the start-up file or settings. The directory "DVD_ENAV" 203 may further comprise a fonts directory 206 storing font files for outputting a text of the additional contents.

In some embodiments, an additional contents directory 207 comprising the additional contents for providing additional contents, i.e., ENAV data files 208 (html files, image files, sound files, etc.) associated with A/V data may be present. The additional contents directory 207 can comprise additional contents subdirectories 209, on the basis of a hierarchical structure, for example.

A video title set directory "Video_TS" 201, for example, comprising video data and an audio title set directory "Audio_TS" 202, for example, comprising audio data is arranged under the root directory, in some embodiments. An item of disk version information associated with the I-DVD and an item of contents manufacturer information are recorded in, for example, the "EnDvd.inf" file of the directory 203. Further, uniformed resource identifier (URI) information associated with a contents provider's server for providing, through a communication network, the additional contents information relating to A/V data to be read and reproduced from the I-DVD can be recorded in the directory 203.

Items of setup information for the initial screen setting at the time of reproducing the data of the interactive DVD can be included in the setup file "index.html" of the directory 203. Items of time stamp information for performing the synchronization between the A/V data and ENAV data to be read and reproduced from the I-DVD are included in the synchronization file "index.syn".

Before the additional contents associated with the A/V data of the I-DVD are loaded into a temporary storage area, various information items for system environment setting included in the start-up file "StartUp.mls" are read and interpreted to initialize the ENAV environment, for example. The various information items may comprise information about contents to be loaded in a memory before the playback, location information of a source for providing the contents information, a parental ID indicating a right to access the recorded A/V data, the language of the additional contents, a website connection during the playback, memory management information, a file to be processed after the start-up file is processed, and a version of the startup file.

Figure 3:
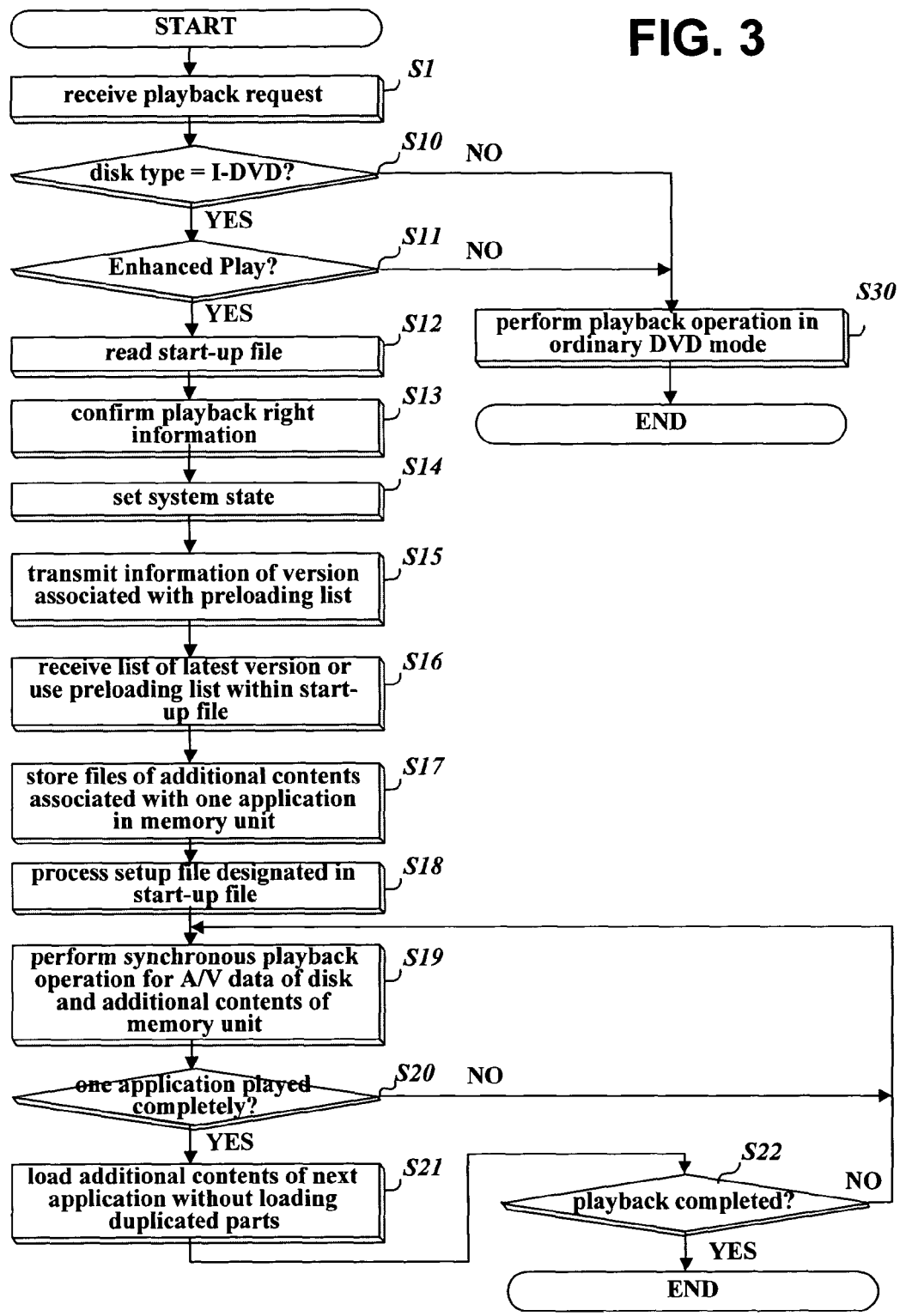
FIG. 3 is a flowchart illustrating a method for setting the playback environment of the interactive disk, in accordance with an embodiment of the invention.

Referring to FIG. 3, a method for reproducing the data of the I-DVD 10 is provided. If a disk is inserted and seated within the player shown in FIG. 1, at step S1, then the control unit 16 searches for a "StartUp.mls" or "EnDVD.Inf" file from a "DVD_ENAV" directory, for example. If a corresponding file is found, the seated disk is detected as an I-DVD, at step S10. Otherwise, the seated disk is detected as a general DVD.

If the seated disk is a general DVD, the control unit 16 performs a playback operation in a general DVD mode in response to a user request, at step S30. If the playback operation is completed, procedure ends. In the playback operation of the DVD mode, data reproduced from the disk is processed through the DVD engine 14 and the processed data is outputted as a video and audio signal.

On the other hand, if the seated disk is an I-DVD 10, it is determined whether data of the I-DVD is to be reproduced in an enhanced mode, at step S11. The enhanced mode is a synchronous playback mode for the additional data (i.e., ENAV data). The enhanced mode can be turned ON/OFF by the user. The initial setting corresponds to an ON state, in one embodiment. If the enhanced mode is in an OFF state, the above-described general DVD playback operation is performed at the above step S30, even if the seated disk is an I-DVD.

In certain embodiments, if the enhanced mode is in an ON state, the start-up file "StartUp.mls", for example, arranged under the "DVD_ENAV" directory is read, at step S12. The start-up file is stored in the memory unit 13, and the iDVD engine 15 is requested to interpret the start-up file. In one embodiment, the iDVD engine 15 interprets the start-up file "StartUp.mls" stored in the memory unit 13, and confirms a parental ID for authorization to reproduce data of the I-DVD at step S13. The iDVD engine then sets a system state, at step S14.

Information of the system state comprises information associated with a language to be used at a time of processing the ENAV data, website connection limitation (i.e., walled garden list), memory management, loading information, etc. For example, the system state can be defined as:

```
<conf type=language con=euc-kr>
<wgarden>http://www.warner.com</wgarden>
<memset>
<pload>36</pload>
</memset>
```

In this exemplary embodiment, The tag "<conf type>", for example, designates the Korean language as the used language. A tag "<wgarden>", for example, designates the website connection limitation or the walled garden list. The tag "<wgarden>", for example, indicates that connections to web sites other than "http://www.warner.com", for example, are not allowed. In conjunction with the memory setting, a tag "<pload>", for example, designates a memory space to be occupied. The tag "<pload>" indicates that a memory space of 36 Mbytes in the memory is occupied, in one or more embodiments. The loading information, for example defines a list of URIs to be preloaded into a memory space and can also provide and ENAV buffer configuration.

The website connection limitation information (i.e., the walled garden list") can comprise a plurality of website addresses. The website connection limitation information is provided to the network interface 17. Then, while the data of the I-DVD is reproduced, the website connection limitation information can be referred to by the user at a time of surfing the web, for example.

In certain embodiments, the walled garden list includes information about websites that can be accessed during the I-DVD playback. In other embodiments, the walled garden list includes information about websites that cannot be accessed during the I-DVD playback. Other implementations are also possible, where a combination of access permission or restrictions may be granted, according the content of the walled garden list.

The iDVD engine 15 confirms a version of a preloading list from the start-up file, and transmits the confirmed version information to a specified server through the network interface 17, at step S15. Location information of the specified server can be confirmed from information designated in the tag "<wgarden>", for example, or from URL information recorded in the "EnDvd.inf" file. A corresponding server receiving the version information transmits the preloading list of a latest version to the player, if the latest version higher than the received version exists in the server. In one embodiment, if the latest version higher than the received version does not exist, the corresponding server notifies the player that the received version is the latest version.

If the preloading list is downloaded, the memory unit 13 receives and stores the downloaded list. The downloaded list is used as preloading information. If the preloading list is not downloaded, the preloading list contained in the start-up file is used as the preloading information, at step S16. Contents recorded in the preloading list and certain ENAV data (e.g., html files, image files, sound files, text files, etc.) is stored in the memory space designated by the above-described tag "<pload>".

The preloading list can be defined in the following formats, in one or more embodiments. Files to be preloaded can vary according to a level of a right to reproduce the data of the DVD as described below or according to a region code.

```
<preload>
  <unit no="1">
    <DATA name="aaa" able="TRUE">
      <INDEX>2th</INDEX>
      <TYPE>doc</TYPE>
      <src t_ID="5" t_lang="all">http://www.disney.com/a/b.htm
      </src>
      <src t_ID="1" t_lang="all">http://www.disney.com/a/c.htm
      </src>
    </DATA>
    ...
  </unit>
  ...
</preload>
```

In the above example, "unit" means a section in which the ENAV data is seamlessly reproduced along with the A/V data linked to the ENAV data. All A/V data items recorded on the I-DVD (i.e., titles) can be configured by one or more applications. One application can be linked to one ENAV unit. An additional contents item to be preloaded for each unit (i.e., an ENAV data item) is defined by a tag "<DATA>" contained in the unit. In the above example, if a playback level (parental ID) is confirmed from the start-up file (i.e., t_ID, is "5") then a file of http://www.disney.com/a/b.htm, for example, is loaded in the memory unit 13.

If a playback level (parental ID) is confirmed from the start-up file (i.e., t_ID, is "1"), then a file of http://www.disney.com/a/c.htm, for example, is loaded in the memory unit 13. The file to be preloaded can be in a remote web site, according to the above-described example, but the file also can be designated as a file recorded in the specified directory of the seated disk. In some embodiments, data files for presentation of "html" files (e.g., image files, sound files, or banner files) are designated under a subsequent tag "<DATA>", for example.

Thus, items designated in each tag "<DATA>" are, for example, read from the seated disk or received from a remote server. The read or received items are sequentially stored in the memory unit 13, in one embodiment. If all files designated within the unit "<unit>", for example, for one application have been stored, a preloading operation is completed, at step S17. If size of files designated within the one unit exceeds, for example, 36 Mbytes described above, the preloading operation is terminated, even if the preloading operation for another unit is not completed.

In one embodiment, the iDVD engine 15 confirms, from the start-up file, a file (e.g., a setup file "index.html") designated to be performed after the start-up file is performed. The iDVD engine 15 requests the control unit 16 to read the confirmed file from the I-DVD 10. If the setup file is loaded in the memory unit 13 in response to the request, the iDVD engine 15 interprets the file at step S18, and configures and outputs an initial screen by the user's selection.

If the user selects "playback start" from the initial screen, the control unit 16 requests the iDVD engine 15 to notify it of a confirmed playback right level. The control unit 16 compares the playback right level received from the iDVD engine 15 with a playback right level set in the player. If the playback right level set in the player is lower than the playback right level confirmed from the start-up file, the control unit 16 does not perform the requested playback, and configures and outputs a message indicating that the requested playback cannot be performed.

In one embodiment, if the playback right level set in the player is not lower than the playback right level confirmed from the start-up file, the control unit 16 begins to reproduce the data of the seated I-DVD 10. A region code set in the player is compared with a region code confirmed from the start-up file. If the region code set in the player is different from the region code confirmed from the start-up file, the playback operation is not performed. Otherwise, the playback operation can be performed.

If the playback operation is initiated, the control unit 16 buffers recorded A/V data in the memory unit 13 while driving the seated I-DVD 10. The buffered A/V data is decoded by the DVD engine 14 so that an A/V signal can be outputted. During this operation, the iDVD engine 15 reads the ENAV data preloaded in the memory unit 13, and performs a decoding operation to output an A/V signal. The A/V signal from the iDVD engine 15 is synthesized with an output signal from the DVD engine 14 by the synthesizer 18. The synthesized signals are outputted externally, at step S19.

In some embodiments, the iDVD engine 15 refers to synchronization information (e.g., linkage information between each file name and time) recorded in a synchronization file "index.syn" to synchronize files configuring the ENAV data with A/V data being reproduced from the I-DVD 10. When a latest version list associated with a preloading list designated in a start-up file "StartUp.mls" recorded on the I-DVD 10 is received from a remote server, a synchronization file "index.syn" is also received. The received synchronization file "index.syn" can be used in place of a synchronization file "index.syn" recorded in the I-DVD 10.

If ENAV data units for a current application preloaded in the memory unit 13 have been outputted, at step S20, the iDVD engine 15 notifies the control unit 16 that some or all of the ENAV data units have been outputted. In response to the notification, the control unit 16 stops the operation of the DVD engine 14. Then, the iDVD engine 15 refers to the above-described interpreted preloading list information, and preloads ENAV data, such as the ENAV units of a next application, in the memory unit 13.

When a file to be preloaded matches a file preloaded in the memory unit 13, for example, a corresponding file is not newly loaded. That is, the corresponding file is not read from the I-DVD 10 or not received from an external server. Data of a previous file stored in the memory unit 13 is used, at step S21, in one embodiment. The exclusion of a loading operation repeat can reduce a preloading time. If the ENAV data of next units has been loaded, then the control unit 16 is notified that the ENAV data has been completely loaded, and the playback operation is initiated from a point when it has been stopped.

The A/V data recorded on the disk and additional contents (ENAV data) associated with the A/V data are synchronized with each other and seamlessly outputted in a synchronized state. The above-described operation is continuously performed until the I-DVD playback is completed or a playback stop request is received from the user, at step S22.

If the user makes a specified website connection request in a synchronous playback or non-playback state, the control unit 16 provides input information to the network interface 17 and requests the network interface 17 to perform a specified website connection. Then, the network interface 17 determines whether a website address for the specified website connection is contained in previously received website connection limitation information. If so, the network interface 17 sends a connection request with a received address, and receives a corresponding web page to store the received web page in the memory unit 13. The iDVD engine 15 interprets the stored web page, and then a video signal is outputted on the basis of the interpreted web page.

If a website address for the specified website connection is not contained in previously received website connection limitation information, the network interface 17 confirms a current operating mode through the control unit 16. If the current operating mode is in the non-playback state or a general DVD playback state, then an operation is performed as in the case where the website address for the specified website connection is contained in the previously received website connection limitation information.

If the current operating mode is in an I-DVD playback state, the connection to the web site based on the request is not performed. At this time, the control unit 16 outputs a message indicating that the connection to the website based on the request cannot be performed in the I-DVD playback state.

In some embodiments, this website connection limitation information is set in the start-up file "StartUp.mls" by a manufacturer of the I-DVD such that a time delay or the memory's load caused by a certain website connection can be prevented in the I-DVD playback state.

Embodiments of the invention are described by way of example as applicable to systems and corresponding methods that provide a method for setting a playback environment of an interactive disk. In this exemplary embodiment, logic code for performing these methods is implemented in the form of, for example, application software. The logic code, in one embodiment, may be comprised of one or more modules that execute on one or more processors in a distributed or non-distributed communication model.

It should also be understood that the programs, modules, processes, methods, and the like, described herein are but an exemplary implementation and are not related, or limited, to any particular computer, apparatus, or computer programming language. Rather, various types of general-purpose computing machines or devices may be used with logic code implemented in accordance with the teachings provided, herein. Further, the order in which the steps of the present method are performed is purely illustrative in nature. In fact, the steps can be performed in any order or in parallel, unless indicated otherwise by the present disclosure.

The method of the present invention may be performed in either hardware, software, or any combination thereof, as those terms are currently known in the art. In particular, the present method may be carried out by software, firmware, or macrocode operating on a computer or computers of any type.

Additionally, software embodying the present invention may comprise computer instructions and stored on a recording medium of any form (e.g., ROM, RAM, magnetic media, punched tape or card, compact disk (CD), DVD, etc.). Accordingly, the present invention is not limited to any particular platform, unless specifically stated otherwise in the present disclosure.

The present invention has been described above with reference to preferred embodiments. However, those skilled in the art will recognize that changes and modifications may be made in these preferred embodiments without departing from the scope of the present invention. The embodiments described above are to be considered in all aspects as illustrative only and not restrictive in any manner. Thus, other exemplary embodiments, system architectures, platforms, and implementations that can support various aspects of the invention may be utilized without departing from the essential characteristics described herein. These and various other adaptations and combinations of features of the embodiments disclosed are within the scope of the invention. The invention is defined by the claims and their full scope of equivalents.

What is claimed is:

1. A method for setting a playback environment for a recording medium, the method comprising:

loading, by a device, a start-up file into a temporary storage area, the start-up file including server access information, the server access list comprising a list of external servers to be accessed;

setting, by the device, a system environment according to system environment elements prior to reproducing A/V data recorded on the recording medium, wherein the system environment elements correspond to at least one of playback right level information, region code information, language information of additional contents associated with the A/V data, and memory management information, wherein the memory management information identifies a space of the temporary storage area for storing at least one of the start-up file and the additional contents, and wherein the additional contents are to be preloaded in the temporary storage area and are differently designated according to the playback right level information and the region code information;

determining, by the device, an availability of the additional contents based on control data received through a communication network from an external server, the external server storing the additional contents and the control data, the control data listing the additional contents to be preloaded;

preloading, by the device, the additional contents in the temporary storage area as a result of the determining step, the additional contents received from the recording medium or the external server; and reproducing, by the device, the A/V data and the additional contents loaded in the temporary storage area according to the control data, wherein the reproducing of the A/V data and the additional contents is restricted based on a comparison of the playback right level information from the start-up file and playback right level information set in a player, and wherein said additional contents includes at least one of an HTML file, an image file and a sound file.

2. The method of claim 1, further comprising:

preloading the control data in the temporary storage area, prior to the A/V data being reproduced.

3. The method of claim 1, further comprising:
storing the control data into the temporary storage area prior to preloading the additional contents in the temporary storage area.

4. The method of claim 1, wherein at least a portion of the additional contents is preloaded in the temporary area in advance of reproducing the A/V data, so that the A/V data can be seamlessly reproduced in synchronization with respective additional contents.

5. The method of claim 1, wherein the step of preloading the additional contents comprises:
setting a language of the additional contents based on the language information; and
allocating the space in the temporary storage area based on the memory management information.

6. The method of claim 5, further comprising:
processing setup information designated within the control data, the setup information comprising information related to a menu screen.

7. The method of claim 1, wherein the step of reproducing the A/V data comprises:
synchronously reproducing the additional contents and the A/V data.

8. The method of claim 1, wherein the step of preloading the additional contents comprises:
preloading the additional contents in the temporary storage area in advance of reproducing the A/V data recorded on the recording medium.

9. The method of claim 1, wherein new additional content is preloaded in the temporary storage area as storage space in the temporary storage area becomes available when the additional content stored in the temporary storage area is reproduced.

10. A non-transitory computer-readable recording medium, comprising instructions configured to cause a device to perform the following steps:
load a start-up file into a temporary storage area, wherein the start-up file includes server access information, the server access information comprising a list of external servers to be accessed;
set a system environment according to system environment elements prior to reproducing audio/video (A/V) data recorded on the recording medium,
wherein the system environment elements correspond to at least one of playback right level information, region code information, language information of additional contents associated with the A/V data, and memory management information,
wherein the memory management information identifies a space of the temporary storage area for storing at least one of the start-up file and the additional contents, and
wherein the additional contents are to be preloaded in the temporary storage area and are differently designated according to the playback right level information and the region code information;
determine an availability of the additional contents based on control data received through a communication network from an external server, the external server storing the additional contents and the control data, the control data listing the additional contents to be preloaded;
preload the additional contents in the temporary storage area as a result of the determining step, the additional contents received from the recording medium or the external server; and
reproduce the A/V data and the additional contents loaded in the temporary storage area according to the control data,
wherein the reproduction of the A/V data and the additional contents is restricted based on a comparison of the playback right level information from the start-up file and playback right level information set in a player, and
wherein said additional contents includes at least one of an HTML file, an image file and a sound file.

11. The computer-readable medium of claim 10, wherein the control information comprises an address of a content provider remotely accessible through a communications network.

12. The computer-readable medium of claim 10, wherein the start-up file comprises access information for accessing the additional contents.

13. The computer-readable medium of claim 12, wherein the start-up file is preloaded into a memory within the device, before the A/V data is reproduced by the device.

14. The computer-readable medium of claim 10, wherein the start-up file is stored as a markup language file.

15. A medium player system, comprising:
a temporary storage with a predetermined capacity and configured to store a start-up file, the start-up file including server access information which comprises a list of external servers to be accessed;
an audio/video (A/V) player engine configured to reproduce A/V data recorded on a medium;
an enhanced player engine configured to reproduce additional contents associated with the A/V data based on system environment elements recorded on the medium or received through a communication network from an external server, the system environment elements being used for the additional contents, the system environment elements being included in the start-up file and comprising at least one of information associated with a playback right level, a region code, a language of the additional contents and memory management information, the memory management information identifying a space of the temporary storage for storing at least the start-up file and the additional contents; and
a controller configured to
set the system environment elements prior to reproducing the A/V data,
control the temporary storage according to the memory management information, and
control the A/V player engine and the enhanced player engine to synchronously reproduce the A/V data and the associated additional contents such that the reproduction of the A/V data and the additional contents is restricted based on a comparison of the playback right level information from the start-up file and playback right level information set in a player,
wherein the start-up file further comprises a plurality of information items for designating additional content categories, the plurality of information items including playback right level information or region code information, and
wherein said additional contents includes at least one of an HTML file, an image file and a sound file.

16. The player system of claim 15,
wherein the environment elements comprise information about a location where the additional contents can be accessed, and
wherein the controller is configured to access the additional contents based on the information about the location.

17. The player system of claim 15, wherein the controller is configured to store the environment elements in the temporary storage, prior to the A/V data being reproduced.

18. The player system of claim 15,
   wherein the start-up file comprises information about the additional contents, and
   wherein the controller is configured to identify the information and to load the additional contents into the temporary storage before the A/V data is reproduced according the identified information.

19. The player system of claim 15, wherein the temporary storage is in a semiconductor storage device.

20. The player system of claim 15, further comprising:
   a network interface configured to communicate with the external server in order to receive information from the external server and send information to the external server,
   wherein the controller is configured to
      determine an availability of the additional contents based on control data received through the network interface from the external server, the control data listing the additional contents to be preloaded, and
      preload the additional contents in the temporary storage area, the additional contents received from the recording medium or the external server.

* * * * *